(12) United States Patent
Kim et al.

(10) Patent No.: US 10,397,916 B2
(45) Date of Patent: Aug. 27, 2019

(54) METHOD FOR PERFORMING RANDOM ACCESS IN WIRELESS LAN SYSTEM AND DEVICE FOR SAME

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/574,777

(22) PCT Filed: May 20, 2016

(86) PCT No.: PCT/KR2016/005382
§ 371 (c)(1),
(2) Date: Nov. 16, 2017

(87) PCT Pub. No.: WO2016/186473
PCT Pub. Date: Nov. 24, 2016

(65) Prior Publication Data
US 2018/0146476 A1 May 24, 2018

Related U.S. Application Data

(60) Provisional application No. 62/163,977, filed on May 20, 2015, provisional application No. 62/167,893, (Continued)

(51) Int. Cl.
*H04W 72/04* (2009.01)
*H04W 84/12* (2009.01)
(Continued)

(52) U.S. Cl.
CPC ....... *H04W 72/0446* (2013.01); *H04W 28/18* (2013.01); *H04W 74/006* (2013.01);
(Continued)

(58) Field of Classification Search
CPC ............. H04W 72/0446; H04W 28/18; H04W 74/006
See application file for complete search history.

(56) References Cited

U.S. PATENT DOCUMENTS

| | | | |
|---|---|---|---|
| 2003/0103521 A1* | 6/2003 | Raphaeli | H04B 3/542 370/445 |
| 2006/0034219 A1* | 2/2006 | Gu | H04L 47/14 370/329 |

(Continued)

FOREIGN PATENT DOCUMENTS

| | | | |
|---|---|---|---|
| WO | WO 2014/061992 A1 | 4/2014 | |
| WO | WO 2015/034166 A1 | 3/2015 | |
| WO | WO 2015/068968 A1 | 5/2015 | |

OTHER PUBLICATIONS

Ericsson, "Further Details on LBT for LAA," 3GPP TSG RAN WG1 Meeting #80, R1-150584, Athens, Greece, Feb. 9-13, 2015, 6 pages.

(Continued)

*Primary Examiner* — Gregory B Sefcheck
*Assistant Examiner* — Jael M Ulysse
(74) *Attorney, Agent, or Firm* — Birch, Stewart, Kolasch & Birch, LLP

(57) ABSTRACT

The present invention relates to a method for performing random access in a wireless LAN system and a device for same. To this end, a station receives from an AP a frame comprising resource allocation information for random access and performs backoff, on the basis of a predetermined contention window size, in resources allocated on the basis of the resource allocation information for random access. In addition, the station transmits, at a first point in which a (Continued)

backoff counter reaches 0, a second frame by means of randomly selected resources which have been randomly selected among the resources that have been allocated as specified, wherein the STA performs clear channel assessment (CCA) for the resources that have been allocated on the basis of the resource allocation information for random access and thus controls the transmission of the second frame by means of the randomly selected resources on the basis of a CCA result.

4 Claims, 15 Drawing Sheets

Related U.S. Application Data filed on May 29, 2015, provisional application No. 62/246,151, filed on Oct. 26, 2015, provisional application No. 62/246,637, filed on Oct. 27, 2015, provisional application No. 62/312,902, filed on Mar. 24, 2016.

(51) Int. Cl.
 *H04W 28/18* (2009.01)
 *H04W 74/00* (2009.01)
 *H04W 74/08* (2009.01)
(52) U.S. Cl.
 CPC ..... *H04W 74/008* (2013.01); *H04W 74/0808* (2013.01); *H04W 74/0841* (2013.01); *H04W 84/12* (2013.01)

(56) References Cited

U.S. PATENT DOCUMENTS

| | | | | |
|---|---|---|---|---|
| 2006/0050742 | A1* | 3/2006 | Grandhi | H04B 7/0413 370/506 |
| 2006/0285516 | A1* | 12/2006 | Li | H04W 74/08 370/329 |
| 2007/0047461 | A1* | 3/2007 | Seo | H04L 1/206 370/252 |
| 2007/0115904 | A1* | 5/2007 | Chen | H04W 72/1278 370/338 |
| 2008/0130519 | A1* | 6/2008 | Bahl | H04L 43/00 370/254 |
| 2009/0040990 | A1* | 2/2009 | Xhafa | H04W 28/18 370/338 |
| 2010/0091717 | A1* | 4/2010 | Bonta | H04W 74/08 370/329 |
| 2010/0195601 | A1* | 8/2010 | Zhang | H04W 74/04 370/329 |
| 2013/0201884 | A1* | 8/2013 | Freda | H04W 72/005 370/278 |
| 2014/0031054 | A1* | 1/2014 | Zou | H04W 16/14 455/452.2 |
| 2014/0086168 | A1* | 3/2014 | Bao | H04W 99/00 370/329 |
| 2015/0049712 | A1* | 2/2015 | Chen | H04W 72/1215 370/329 |
| 2015/0057011 | A1* | 2/2015 | Di Girolamo | H04W 74/0808 455/454 |
| 2015/0201434 | A1* | 7/2015 | Fang | H04W 74/0816 370/335 |
| 2016/0050667 | A1* | 2/2016 | Papasakellariou | H04L 5/0053 370/329 |
| 2016/0113034 | A1* | 4/2016 | Seok | H04W 74/04 370/329 |
| 2016/0128024 | A1* | 5/2016 | Frederiks | H04W 72/04 370/329 |
| 2016/0128102 | A1* | 5/2016 | Jauh | H04W 74/0833 370/329 |
| 2016/0212625 | A1* | 7/2016 | Damnjanovic | H04W 74/0875 |
| 2016/0242213 | A1* | 8/2016 | Dabeer | H04W 74/0833 |
| 2016/0262173 | A1* | 9/2016 | Josiam | H04B 7/0452 |
| 2016/0278088 | A1* | 9/2016 | Cheng | H04L 47/27 |
| 2016/0316474 | A1* | 10/2016 | Merlin | H04W 72/0413 |

OTHER PUBLICATIONS

Intel Corporation, "LBT Design for LAA Downlink," 3GPP TSG RAN WG1 Meeting #80, R1-150089, Athens, Greece, Feb. 9-13, 2015, pp. 1-8.

* cited by examiner

METHOD FOR PERFORMING RANDOM ACCESS IN WIRELESS LAN SYSTEM AND DEVICE FOR SAME

CROSS REFERENCE TO RELATED APPLICATIONS

This application is the National Phase of PCT International Application No. PCT/KR2016/005382, filed on May 20, 2016, which claims priority under 35 U.S.C. 119(e) to U.S. Provisional Application No. 62/163,977, filed on May 20, 2015, No. 62/167,893, filed on May 29, 2015, No. 62/246,151, filed on Oct. 26, 2015, No. 62/246,637, filed on Oct. 27, 2015, and No. 62/312,902, filed on Mar. 24, 2016, all of which are hereby expressly incorporated by reference into the present application.

TECHNICAL FIELD

The following description relates to a method of efficiently performing random access in a wireless local area network (WLAN) system and an apparatus therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

Since the above-described standards for the WLAN technology maximally use bandwidth of 160 MHz and support eight spatial streams, IEEE 802.11ax standardization is being discussed in addition to IEEE 802.11ac standard maximally supporting a rate of 1 Gbit/s.

DETAILED DESCRIPTION OF THE INVENTION

Technical Problems

In IEEE 802.11ax standardization, it is expected that a random access scheme will be used for signal transmission of stations (STAs) that have not accessed an access point (AP). Random access performed in a state in which the AP cannot provide detailed scheduling information to the STAs may cause collision between the STAs. Accordingly, a method and an apparatus for efficiently controlling occurrence of collision are needed.

Technical Solutions

A method of performing random access to an access point (AP) by a station (STA) operating in a wireless local area network (WLAN) system, the method comprising: receiving a first frame including resource allocation information for random access from the AP; performing backoff based on a predetermined contention window size in resources allocated according to the resource allocation information for random access; an transmitting a second frame through a randomly selected resource from among the resources allocated according to the resource allocation information for random access at a first timing at which a backoff count reaches 0, wherein the STA performs clear channel assessment (CCA) for the resources allocated according to the resource allocation information for random access to adjust transmission of the second frame through the randomly selected resource according to a result of CCA.

Additionally or alternatively, the method further comprising, when the randomly selected resource at the first timing is busy as the result of CCA not transmitting the second frame at the first timing.

Additionally or alternatively, the method further comprising: receiving a third frame including resource allocation information for subsequent random access from the AP; and transmitting, at a second timing, the second frame, which has not been transmitted at the first timing, through a second another randomly selected resource from among resources allocated according to the resource allocation information for subsequent random access based on the third frame.

Additionally or alternatively, when the third frame is received, the second timing is determined while the backoff count is maintained at 0.

Additionally or alternatively, when the randomly selected resource at the first timing is determined to be busy as the result of CCA, the randomly selected resource is adjusted as one of resources which are idle at the first timing according to a predetermined rule.

Additionally or alternatively, the adjusted resource is determined to be a first resource which is idle among resource units subsequent to the randomly selected resource.

Additionally or alternatively, the randomly selected resource is randomly selected from among resources which are idle as the result of CCA.

Additionally or alternatively, the predetermined contention window size is determined in correspondence to the number of resource units of the resources allocated according to the resource allocation information for random access.

Additionally or alternatively, the method further comprising: setting a random access threshold value corresponding to the number of resource units which are idle among the resources allocated according to the resource allocation information for random access; and not attempting to perform random access in the resources allocated according to the resource allocation information for random access of the first frame, when a randomly selected value within the predetermined contention window size is larger than the random access threshold value.

A station (STA) for operating in a wireless local area network (WLAN) system, the STA comprising: a transceiver configured to receive a first frame including resource allocation information for random access from an access point (AP) and transmit a second frame through a randomly selected resource from among resources allocated according to the resource allocation information for random access; and a processor connected to the transceiver and is configured to: perform backoff based on a predetermined contention window size in the resources allocated according to the resource allocation information for random access, and control the transceiver to transmit the second frame through the randomly selected resource at a first timing at which a backoff count reaches 0, wherein the processor is further configured to performs clear channel assessment (CCA) for the resources allocated according to the resource allocation information for random access to adjust transmission of the second frame through the randomly selected resource according to a result of CCA.

Additionally or alternatively, when the randomly selected resource at the first timing is busy as the result of CCA, the processor is further configured to control the transceiver not to transmit the second frame at the first timing.

Additionally or alternatively, when the transceiver receives a third frame including resource allocation information for subsequent random access from the AP; the processor is further configured to control the transceiver to transmit, at a second timing, the second frame, which has not been transmitted at the first timing, through a second randomly selected resource from among resources allocated according to the resource allocation information for subsequent random access based on the third frame.

Additionally or alternatively, the processor determines the second timing while the backoff count is maintained at 0 when the transceiver receives the third frame.

Additionally or alternatively, the processor is further configured to adjusts the randomly selected resource as one of resources which are idle at the first timing according to a predetermined rule when the randomly selected resource at the first timing is determined to be busy as the result of CCA.

Additionally or alternatively, the processor is further configured to randomly select the randomly selected resource from among resources which are idle as the result of CCA.

Advantageous Effects

According to the present invention as described above, control information can be efficiently transmitted in a radio frame transmission for multi-user transmission.

BEST MODE FOR CARRYING OUT THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method of efficiently performing random access by STAs in a WLAN system and an apparatus therefor. To this end, the WLAN system to which the present invention is applied will not be described in detail.

Figure 1:
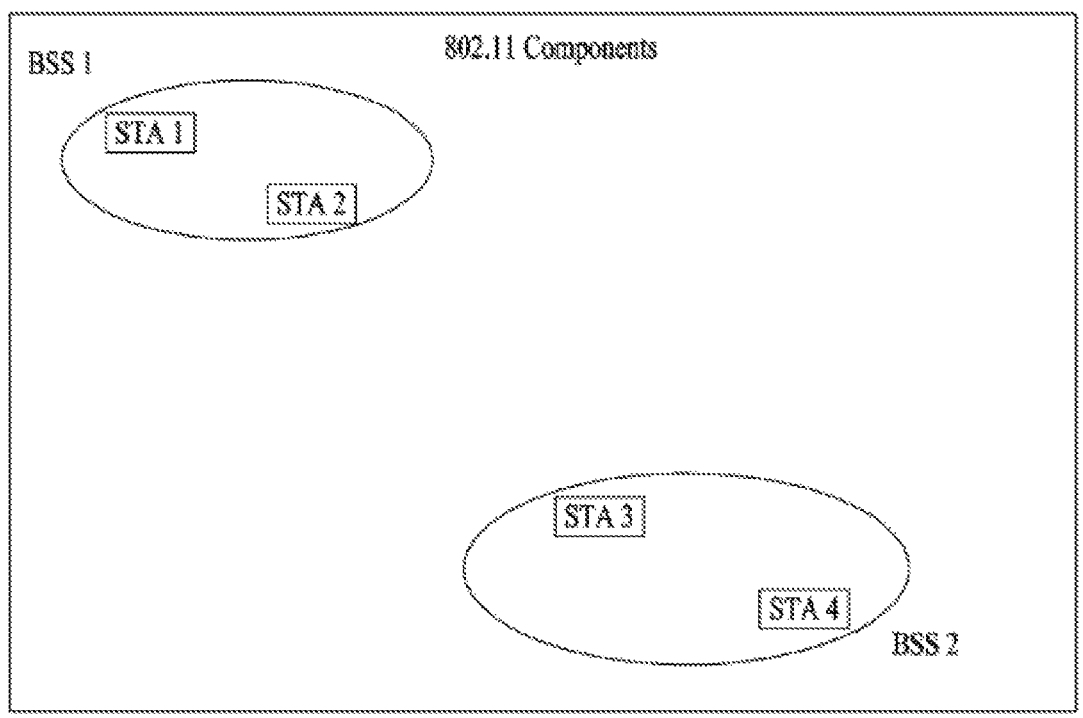
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
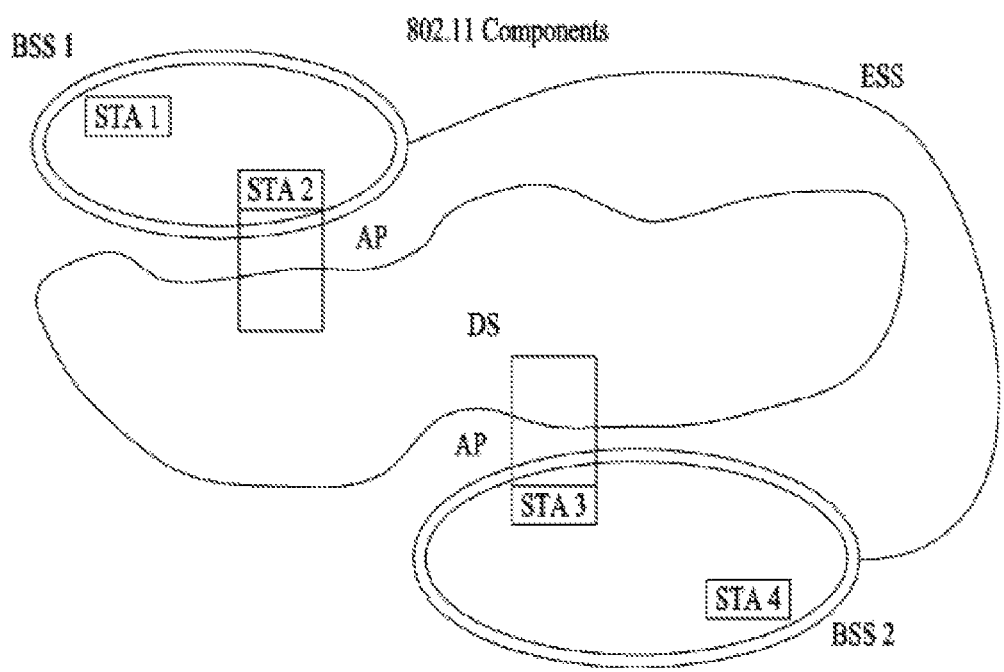
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
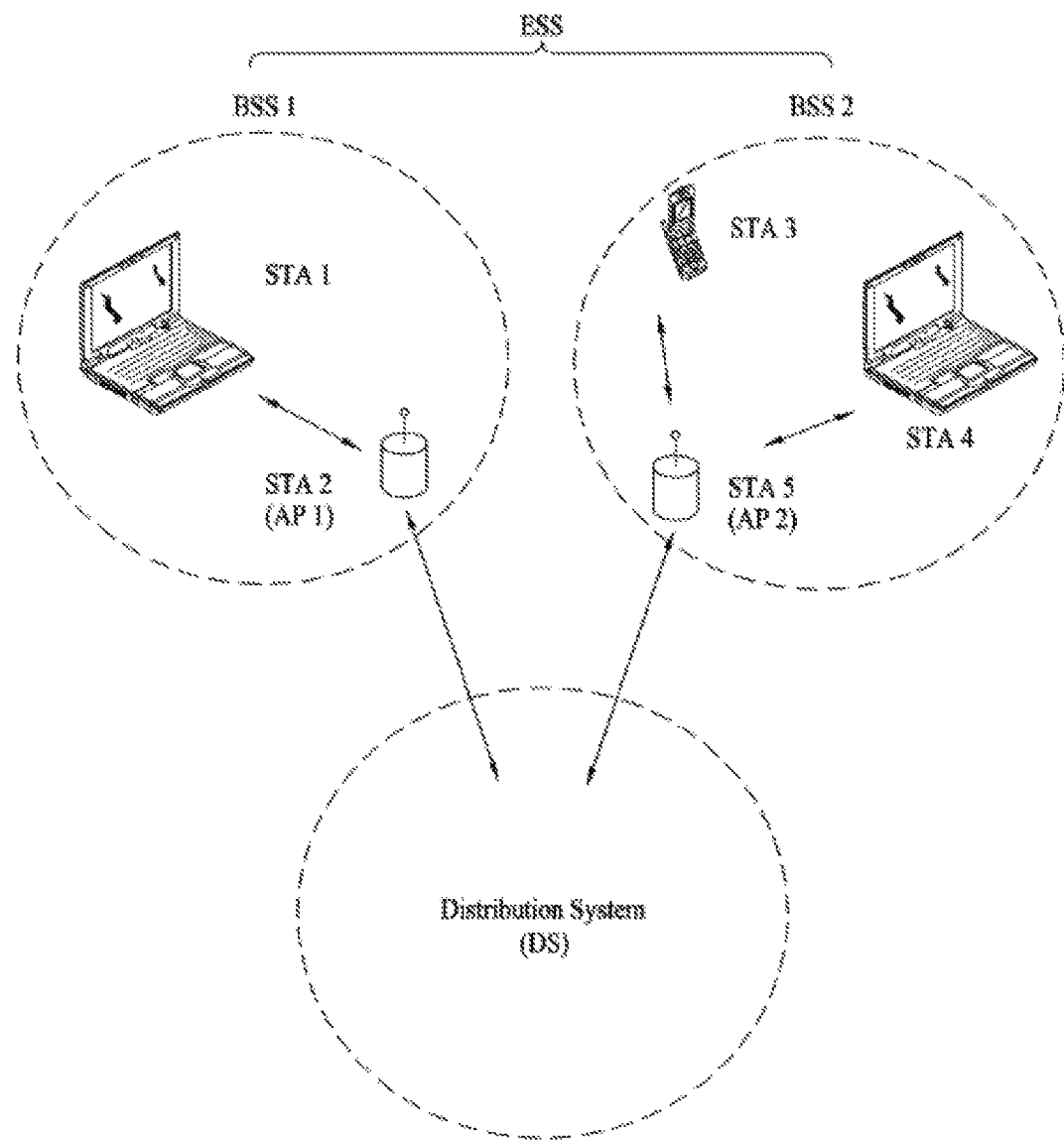
FIG. 3 is a diagram illustrating an exemplary structure of a WLAN system.

FIG. 3 is a diagram illustrating an exemplary structure of a WLAN system. FIG. 3 shows an example of an infrastructure BSS including a DS.

In the example of FIG. 3, BSS1 and BSS2 configure an ESS. In the WLAN system, a station operates according to MAC/PHY rules of IEEE 802.11. The station includes an AP station and a non-AP station. The non-AP station corresponds to an apparatus directly handled by a user, such as a laptop or a mobile telephone. In the example of FIG. 3, a station 1, a station 3 and a station 4 are non-AP stations and a station 2 and a station 5 are AP stations.

In the following description, the non-AP station may be referred to as a terminal, a wireless transmit/receive unit (WTRU), a user equipment (UE), a mobile station (MS), a mobile terminal, a mobile subscriber station (MSS), etc. In addition, the AP corresponds to a base station (BS), a node-B, an evolved node-B (eNB), a base transceiver system (BTS), a femto BS, etc. in different wireless communication fields.

Figure 4:
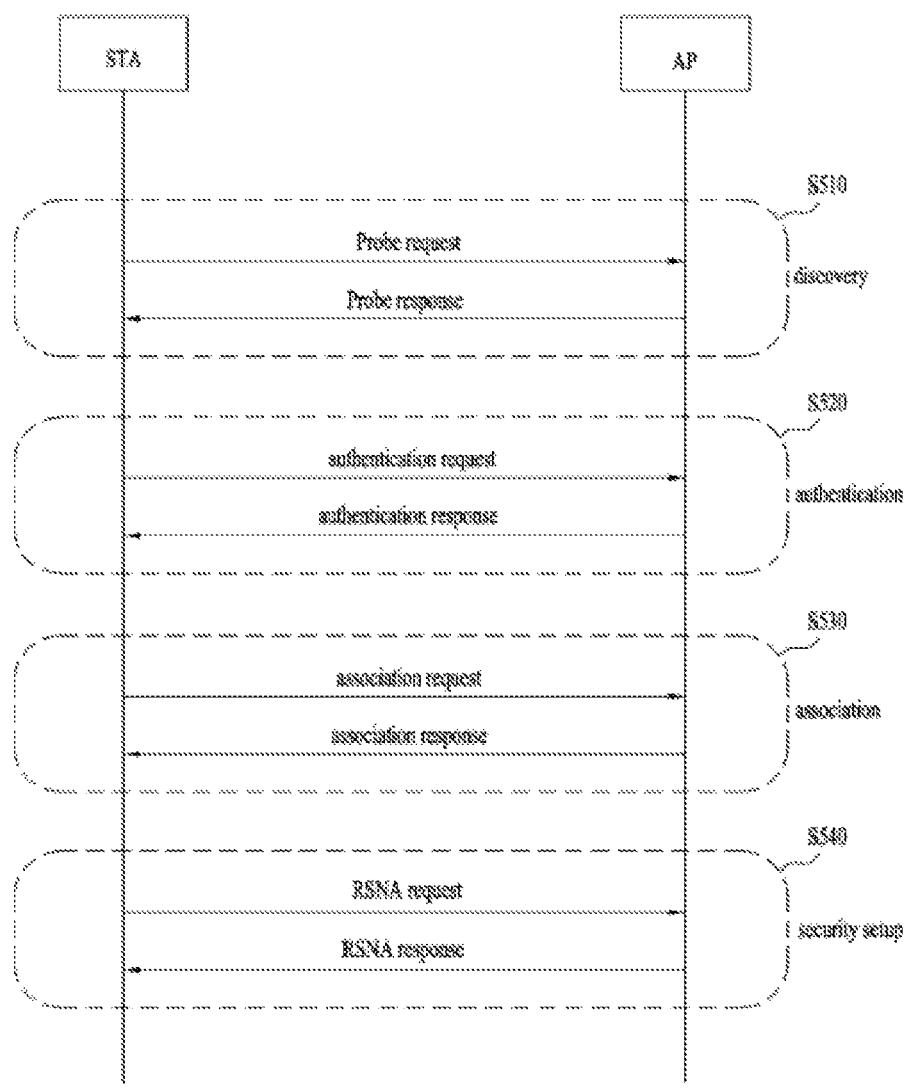
FIG. 4 is a diagram for explaining a general link setup process.
Figure 5:
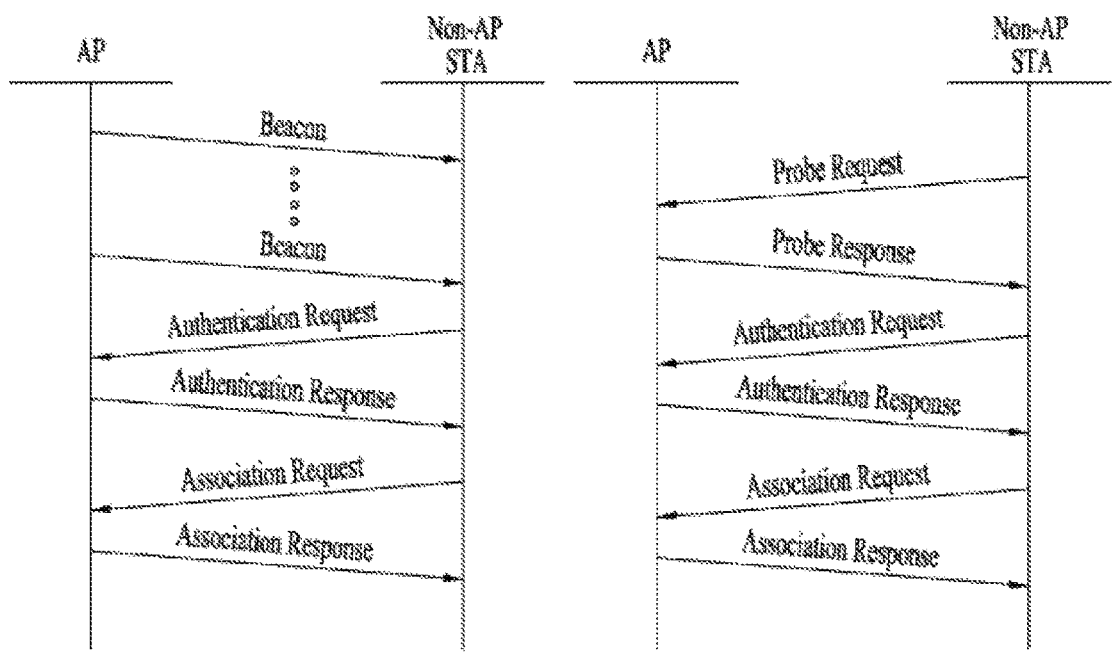
FIG. 5 is a diagram for explaining active scanning and passive scanning methods.

FIG. 4 is a diagram for explaining a general link setup process and FIG. 5 is a diagram for explaining active scanning and passive scanning methods.

To establish a link with a network and perform data transmission and reception, an STA discovers the network, performs authentication, establishes association and performs an authentication process for security. The link setup process may be referred to as a session initiation process or a session setup process. In addition, discovery, authentication, association and security setup of the link setup process may be collectively referred to as an association process.

An exemplary link setup process will be described with reference to FIG. 4.

In step S510, the STA may perform a network discovery operation. The network discovery operation may include a scanning operation of the STA. That is, the STA discovers the network in order to access the network. The STA should identify a compatible network before participating in a wireless network and a process of identifying a network present in a specific area is referred to as scanning.

The scanning method includes an active scanning method and a passive scanning method. Although FIG. 4 shows a network discovery operation including an active scanning process, the network discovery operation can be performed through a passive scanning process.

In active scanning, the STA which performs scanning transmits a probe request frame while moving between channels and waits for a response thereto, in order to detect which AP is present. A responder transmits a probe response frame to the STA, which transmitted the probe request frame, as a response to the probe request frame. The responder may be an STA which lastly transmitted a beacon frame in a BSS of a scanned channel. In the BSS, since the AP transmits the beacon frame, the AP is the responder. In the IBSS, since the STAs in the IBSS alternately transmit the beacon frame, the responder is not fixed. For example, the STA which transmits the probe request frame on a first channel and receives the probe response frame on the first channel stores BSS related information included in the received probe response frame, moves to a next channel (e.g., a second channel) and performs scanning (probe request/response transmission/reception on the second channel) using the same method.

In addition, referring to FIG. 5, a scanning operation may be performed using a passive scanning method. In passive scanning, the STA which performs scanning waits for a beacon frame while moving between channels. The beacon frame is a management frame in IEEE 802.11 and is periodically transmitted in order to indicate presence of a wireless network and to enable the STA, which performs scanning, to discover and participate in the wireless network. In the BSS, the AP is responsible for periodically transmitting the beacon frame. In the IBSS, the STAs alternately transmit the beacon frame. The STA which performs scanning receives the beacon frame, stores information about the BSS included in the beacon frame, and records beacon frame information of each channel while moving to another channel. The STA which receives the beacon frame may store BSS related information included in the received beacon frame, move to a next channel, and perform scanning on the next channel using the same method.

Compared to the passive scanning, the active scanning has a small delay and less power consumption.

After the STA has discovered the network, an authentication process may be performed in step S520. Such an authentication process may be referred to as a first authentication process to be distinguished from a security setup operation of step S540, which will be described later.

The authentication process includes the following processes. The STA transmits an authentication request frame to the AP and then, the AP transmits an authentication response frame to the STA in response to the authentication request frame. The authentication frame used for authentication request/response corresponds to a management frame.

The authentication frame may include information on an authentication algorithm number, an authentication transaction sequence number, a status code, a challenge text, a robust security network (RSN), a finite cyclic group, etc. Such information is merely an example of information included in the authentication request/response frame and can be replaced with different information. Moreover, additional information may be further included.

The STA may transmit the authentication request frame to the AP. The AP may determine whether authentication of the STA is allowed, based on the information included in the received authentication request frame. The AP may provide the STA with the authentication result through the authentication response frame.

After the STA is successfully authenticated, an association process may be performed in step S530. The association process includes the following processes. The STA transmits an association request frame to the AP and the AP transmits an association response frame to the STA in response thereto.

For example, the association request frame may include information on a variety of capabilities, beacon listen interval, service set identifier (SSID), supported rates, RSN, mobility domain, supported operating classes, traffic indication map (TIM) broadcast request, interworking service capability, etc.

For example, the association response frame may include information on a variety of capabilities, status code, association ID (AID), supported rates, enhanced distributed channel access (EDCA) parameter set, received channel power indicator (RCPI), received signal to noise indicator (RSNI), mobility domain, timeout interval (association comeback time), overlapping BSS scan parameter, TIM broadcast response, QoS map, etc.

This information is merely an example of information included in the association request/response frame and may be replaced with different information. Moreover, additional information may be further included.

After the STA is successfully associated with the network, a security setup process may be performed in step S540. The security setup process of step S540 may be referred to as an authentication process through a robust security network association (RSNA) request/response. In addition, the authentication process of step S520 may be referred to as the first authentication process and the security setup process of step S540 may be simply referred to as an authentication process.

The security setup process of step S540 may include a private key setup process through 4-way handshaking of an extensible authentication protocol over LAN (EAPOL) frame. In addition, the security setup process may be performed according to a security method which is not defined in the IEEE 802.11 standard.

Hereinafter, random access in the WLAN system introduced in an IEEE 802.11ax system will be explained based on the above description.

Random Access in WLAN System

To raise MAC efficiency, an uplink multi-user (UL MU) protocol such as UL orthogonal frequency division multiple access (OFDMA) or UL MU multiple-input multiple-output (MIMO) may be used in a WLAN. A UL MU PLCP protocol data unit (PPDU) is transmitted as an immediate response (e.g., a short interframe space (SIFS), a PCF interface space (PIFS), etc.) to a trigger frame transmitted by an AP. The AP may allocate an MU resource to a plurality of STAs by including information such as STA IDs and resource units in the trigger frame. However, since the AP cannot allocate a UL MU resource to unassociated STAs or to STAs which are awoken from a sleep state for UL frame transmission, the AP may allocate a random access resource which can be used by all STAs. If the random access resource is allocated, STAs may select a random slot from the allocated resource and transmit a UL frame.

Figure 6:
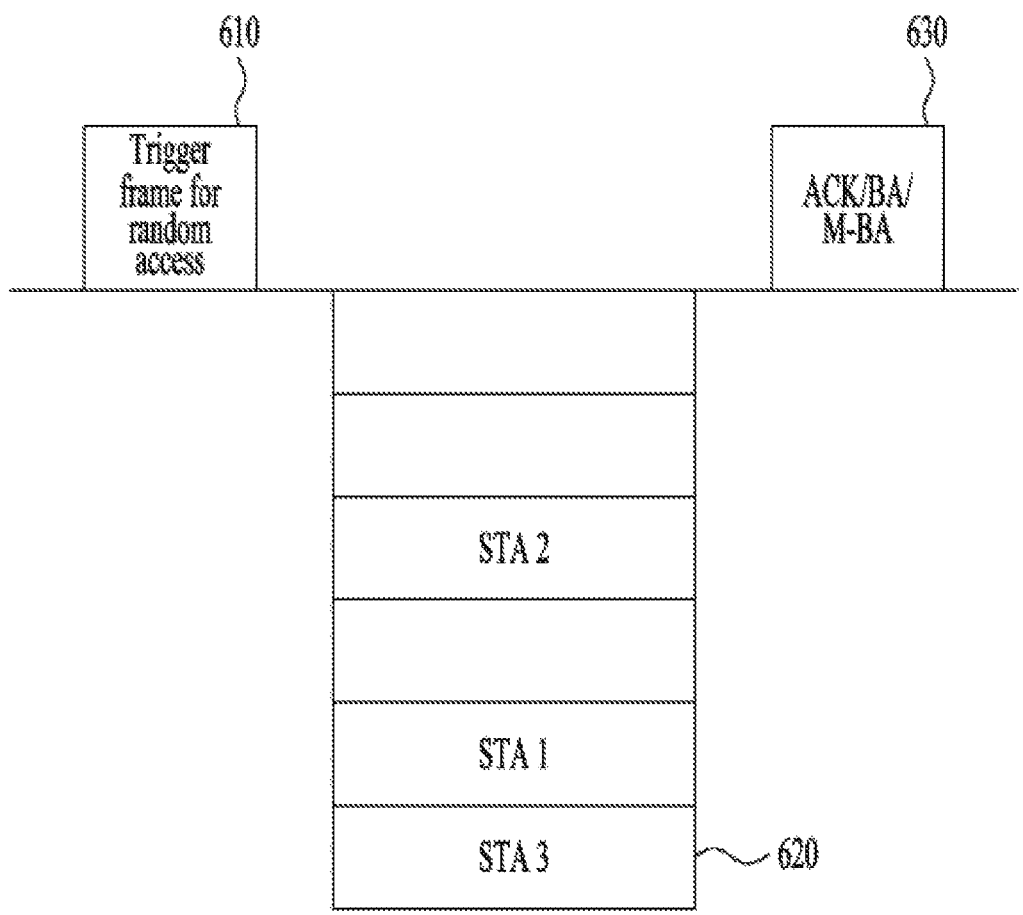
FIG. 6 is a diagram schematically illustrating a random access procedure according to an embodiment of the present invention

FIG. 6 is a diagram schematically illustrating a random access procedure according to an embodiment of the present invention.

An AP may transmit a trigger frame for random access of STAs (S610). The trigger frame for random access may provide resource allocation information for random access to the STAs. In the example of FIG. 6, the AP allocates 6 resource regions by transmitting the trigger frame. STA2 randomly selects the third resource unit, STA1 selects the fifth resource unit, and STA3 selects sixth resource unit, thereby to transmit frames (S620). Upon frames from the STAs, the AP may transmit an acknowledgement signal (ACK). In some cases, the AP may transmit a block ACK (BA) or multi-user block ACK (M-BA).

Meanwhile, a procedure for preventing collision may be required even in the above-described random access procedure of the WLAN system. In association with the procedure for preventing collision, a distributed coordination function (DCF), which is a carrier sense multiple access/collision avoidance (CSMA/CA) mechanism used in the WLAN system, will now be described.

Figure 7:
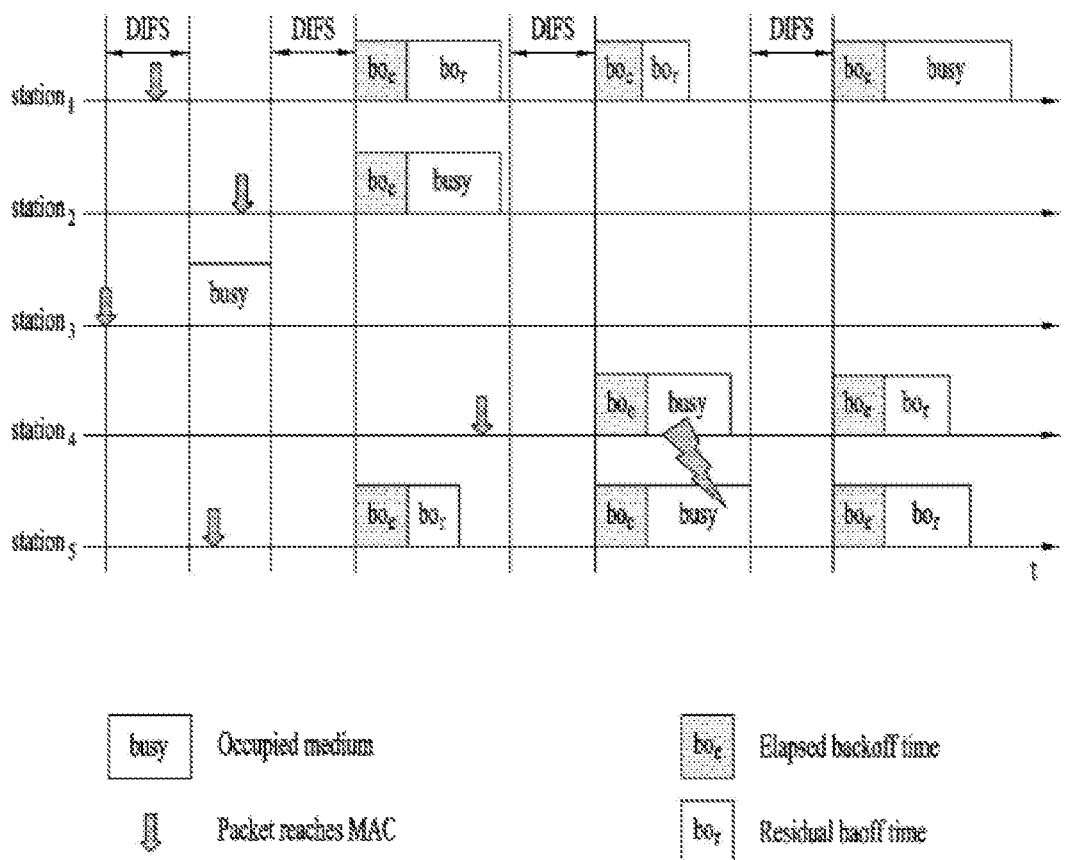
FIG. 7 is a diagram illustrating a DCF mechanism in a WLAN system.

FIG. 7 is a diagram illustrating a DCF mechanism in the WLAN system.

According to the DCF mechanism, STAs having data to be transmitted perform clear channel assessment (CCA) of sensing a medium for a specific duration (e.g., DCF interframe space (DIFS)) before transmitting the data. Here, when the medium is idle (usable), an STA may transmit signals using the medium. On the other hand, when the medium is busy (unusable), the STA may transmit data after waiting for DIFS plus a random backoff period on the assumption that several STAs are waiting to use the medium. Herein, the random backoff period enables collision avoidance because STAs stochastically have different backoff interval values and thus have different transmission times on the assumption that multiple STAs to transmit data are present. When an STA starts to transmit data, the other STAs are not allowed to use the medium.

A random backoff time and procedure are briefly described below.

When a specific medium switches from "busy" to "idle", STAs start to prepare for data transmission. Here, the STAs that attempt to transmit data select respective random backoff counts and wait for corresponding slot times in order to minimize collision. The random backoff count is a pseudo-random integer and each STA selects one uniformly distributed value in the range of [0 CW] as the random backoff count. CW refers to a contention window.

A CW parameter takes a minimum value of CW, CWmin, as an initial value but the initial value is doubled if transmission fails. For example, if an ACK response to a transmitted data frame is not received, it may be considered that collision has occurred. If the CW parameter is a maximum value of CW, CWmax, CWmax is maintained until data transmission is successful and CWmax is reset to CWmin when data transmission is successful.

When a random backoff procedure is started, an STA selects a random backoff count within the range of [0 CW] and then keeps monitoring the medium while counting down a backoff slot. If the medium switches to a busy state in the meantime, the STA stops counting down the backoff slot. The STA resumes counting down of the remaining backoff slot when the medium becomes idle again.

Referring to FIG. 7, when multiple STAs have data to be transmitted, STA3 may immediately transmit a data frame since the medium has been idle for a DIFS and the other STAs wait for the medium to become idle. Since the medium is busy for a while, STAs may watch for an opportunity to use the medium. Accordingly, each STA selects a random backoff count. It can be seen from FIG. 7 that STA2, which has selected the smallest backoff count, transmits a data frame.

After transmission from STA2 is finished, the medium switches back to the idle state and STAs resume counting down of the backoff slot. It can be seen from FIG. 7 that STA5, which has the second smallest random backoff count after that of STA2 and temporarily stops counting down while the medium is busy, counts down the remaining backoff slot and then starts data frame transmission, but collision occurs since the random backoff count of STA5 accidentally overlaps with the random backoff count of STA4. In this case, neither of the two STAs receives ACK response after data transmission and thus the CW is doubled and the STAs re-select random backoff count values.

The most fundamental CSMA/CA is carrier sensing. An STA may use physical carrier sensing and virtual carrier sensing to determine whether a DCF medium is busy or idle. Physical carrier sensing is performed in a PHY stage through energy detection or preamble detection. For example, when it is determined that a receiver has measured a voltage level or read a preamble, the medium may be determined to be busy. Virtual carrier sensing sets a network allocation vector (NAV) to prevent other STAs from transmitting data and is performed according to a duration field value of a MAC header. To decrease collision possibility, a robust collision detection mechanism has been introduced and an operating using a request to send (RTS)/clear to send (CTS) frame has been introduced for the robust collision detection mechanism.

Now, the backoff procedure in random access will be described with reference to FIG. 6 based on the above description.

Upon receiving the trigger frame from the AP, the STAs may perform the backoff procedure based on the size of a backoff contention window size for random access. The size of the backoff contention window is desirably a size corresponding to the number of resource units allocated from the trigger frame. Each of the STAs may perform the backoff procedure based on a backoff value selected in the range of the contention window and transmit a frame, as illustrated in FIG. 6, through a resource randomly selected from among random access resources at a timing when the value of a backoff count reaches 0.

Meanwhile, the random access procedure of the WLAN system has been described on the assumption that backoff is performed in units of allocated resource units without performing CCA. That is, the random access procedure may be performed in a manner of reducing the backoff count with respect to a random access resource allocated to a corresponding STA regardless of whether a medium is busy or idle. Hereinafter, a random access control method considering a busy/idle state of a medium by performing CCA, in addition to the above-described procedure, will be proposed.

CCA Based Random Access

Figure 8:
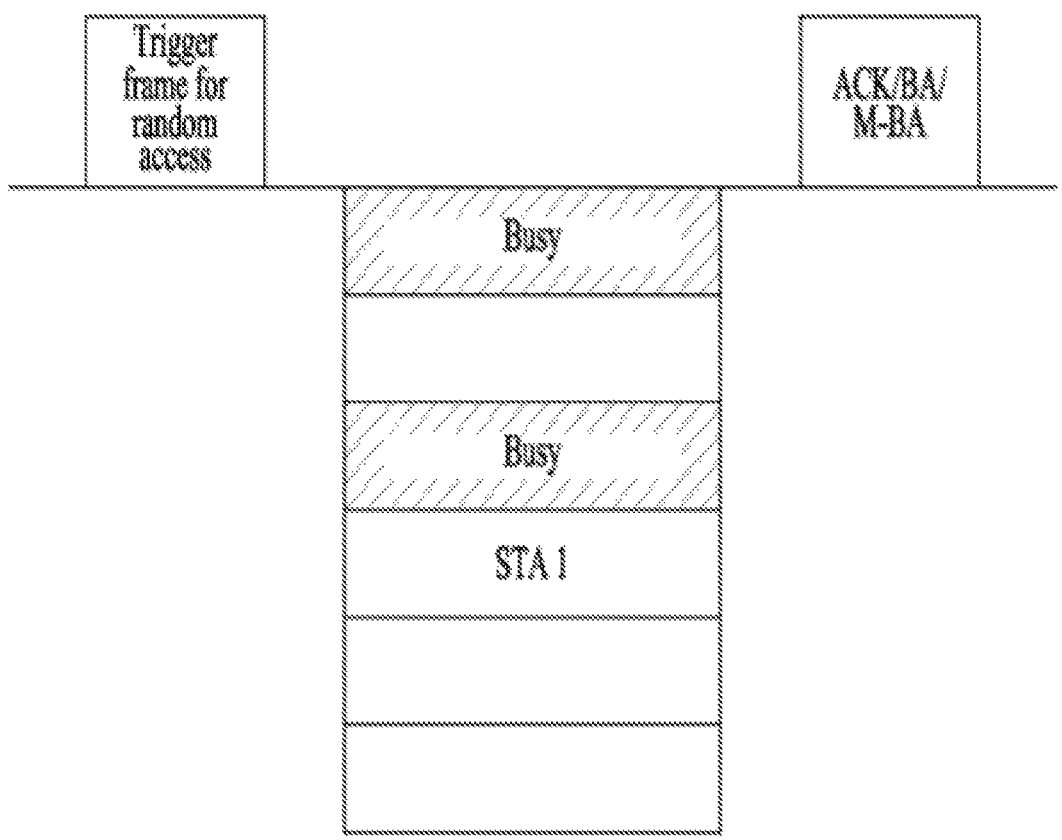
FIG. 8 is a diagram illustrating a method of performing a random access procedure based on CCA according to an embodiment of the present invention.

FIG. 8 is a diagram illustrating a method of performing a random access procedure based on CCA according to an embodiment of the present invention.

In this embodiment, STAs check CCA before (or after) receiving a trigger frame for random access. As a result of CCA, it may be determined that first and third slots are busy among 6 random access resource units. In this case, the STAs may select a random access resource in consideration of the result of CCA and transmit a frame through the selected resource.

FIG. 8 illustrates an example in which a randomly selected resource is irrelevant to a busy slot as a result of CCA. That is, since STA 1 has selected the fourth slot as a random selection resource and it has been determined that the fourth slot is idle, STA 1 may transmit a frame through the selected fourth slot.

Figure 9:
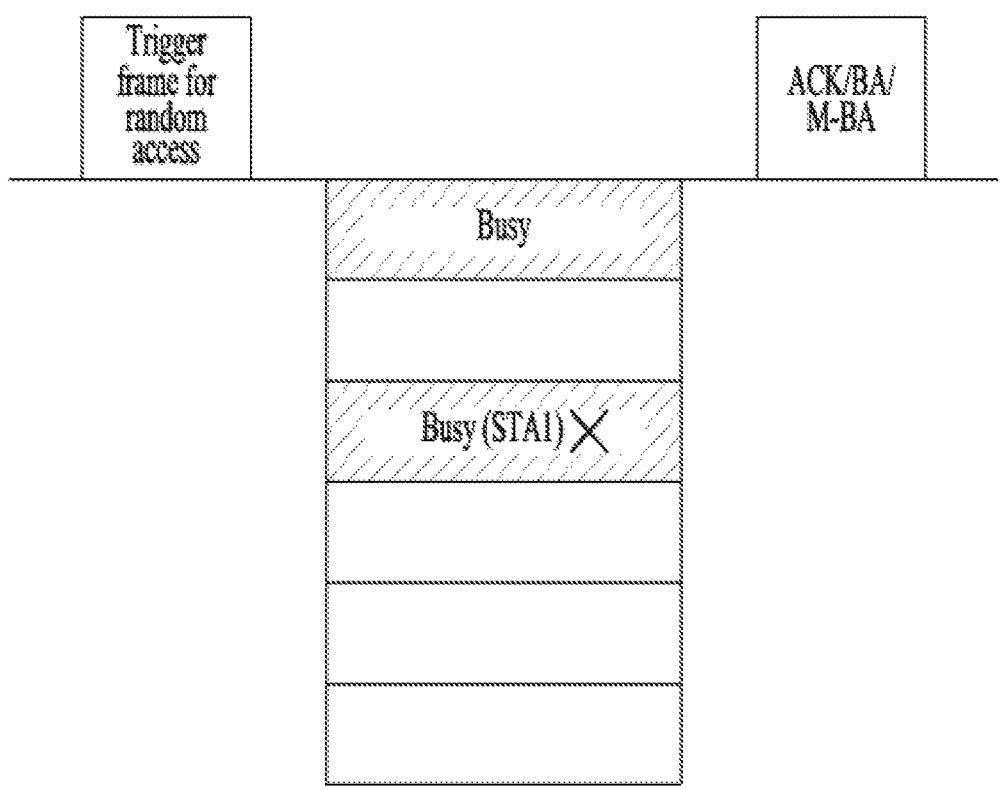
FIGS. 9 and 10 are diagrams illustrating transmission delay of a random access frame considering a result of CCA according to an embodiment of the present invention.
Figure 10:
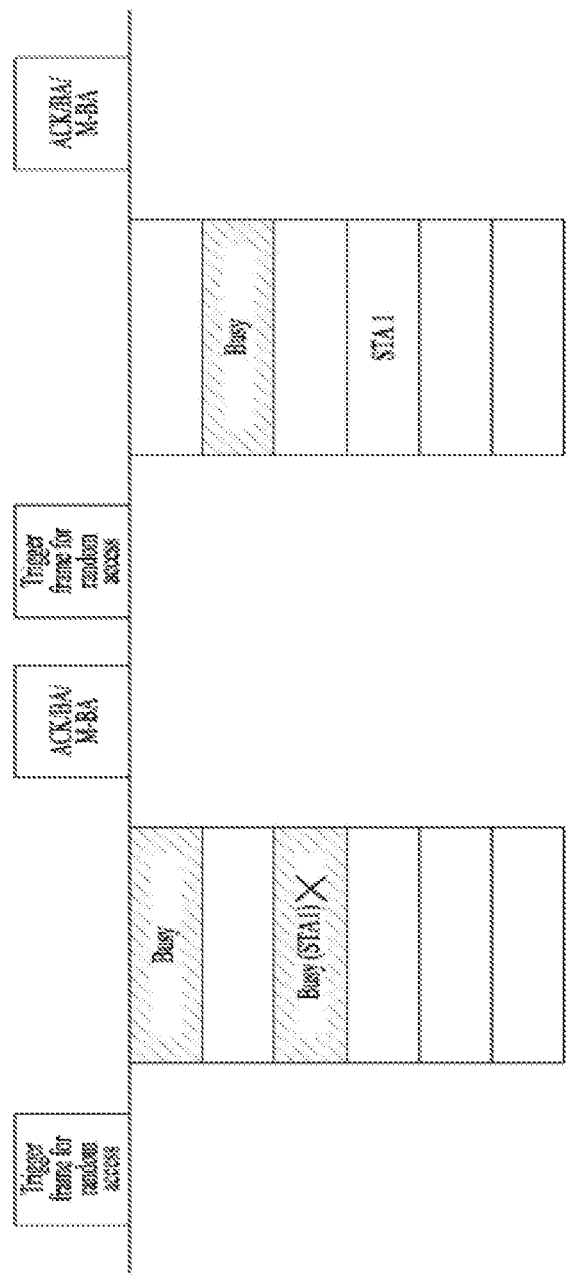

FIGS. 9 and 10 are diagrams illustrating transmission delay of a random access frame considering a result of CCA according to an embodiment of the present invention.

Specifically, referring to FIG. 9, if a randomly selected resource region belongs to a busy channel, an STA does not transmit a random access frame in the selected region. In the example of FIG. 9, since STA 1 has selected a random value 3 but a channel for the selected region is in a busy state, STA1 does not transmit a random access frame in a duration corresponding to a first trigger frame.

In this case, STA 1 re-attempts to transmit the random access frame in a duration corresponding to the next trigger frame as illustrated in FIG. 10. That is, while maintaining a random backoff value 0 of STA1, STA1 may select a resource region in which STA1 is to transmit a frame through random selection in the next trigger frame and then transmit the frame in the selected resource region.

In the example of FIG. 10, STA 1 receives the first trigger frame and attempts to perform random access. While performing random selection, STA 1 selects a random value 3 and tries to transmit a frame. However, since a corresponding resource region belongs to a busy subchannel, STA 1 does not attempt to transmit the frame and delays frame transmission in a corresponding resource region. In this case, while maintaining a random backoff value (i.e., 0), STA 1 may attempt to perform random access in transmission of the next trigger frame (the second trigger frame in the example).

In this case, after receiving the second trigger frame, STA 1 selects a random value in a region allocated by the trigger frame in order to attempt to perform random access and attempts to transmit a frame. In the above example, STA 1 may select a random value 4 in the second trigger frame and transmit a frame because a corresponding channel is idle.

Figure 11:
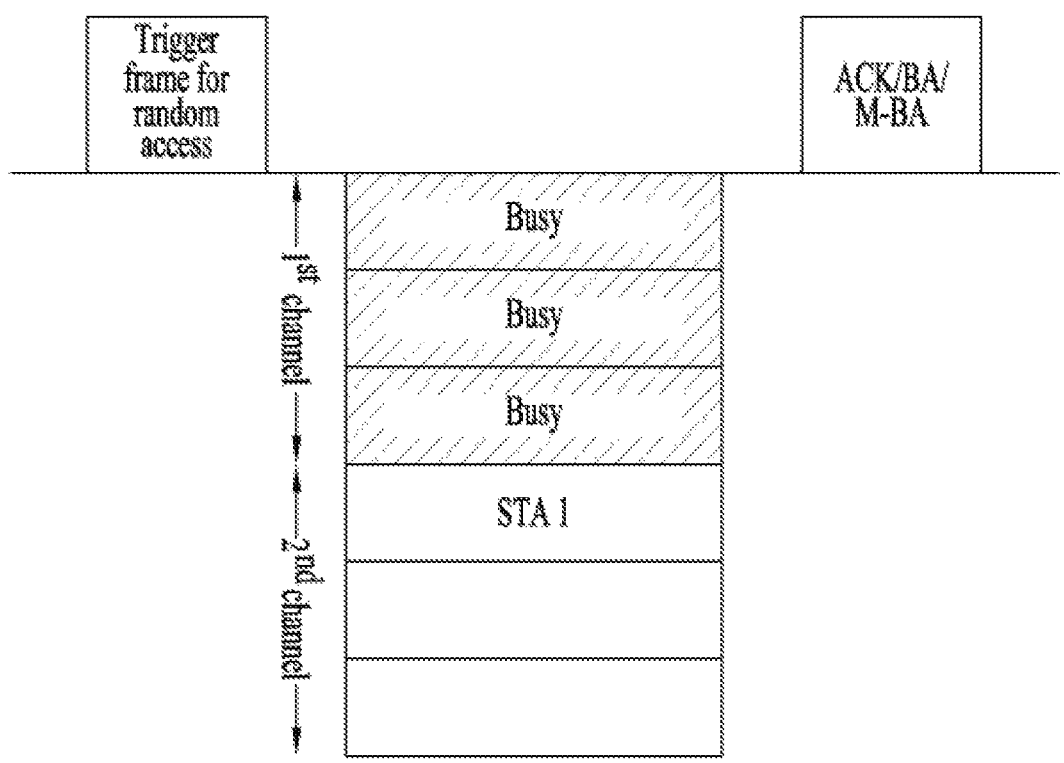
FIGS. 11 and 12 are diagrams illustrating a method of performing random access based on a predetermined rule when a randomly selected resource is in a busy state according to an embodiment of the present invention.
Figure 12:
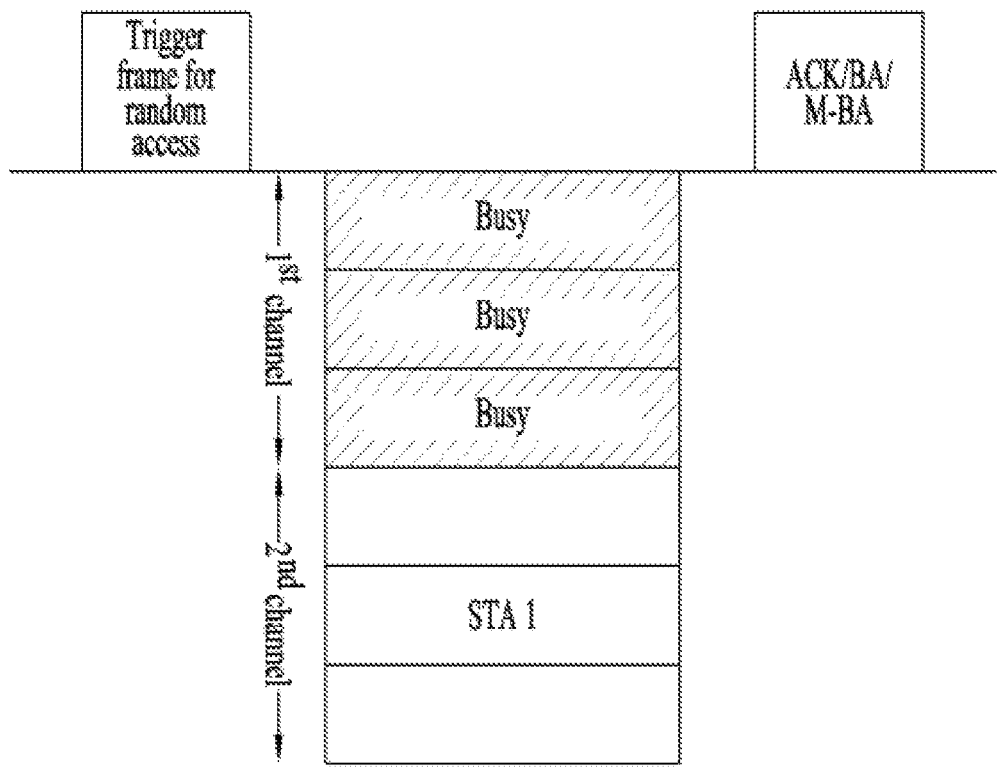

FIGS. 11 and 12 are diagrams illustrating a method of performing random access based on a predetermined rule when a randomly selected resource is in a busy state according to an embodiment of the present invention.

As illustrated in FIG. 11, if a resource region selected by an STA belongs to a busy channel, the STA transmits a frame using the first (or last) resource region (slot) of an idle channel (or from among idle channels) after the selected resource region. However, as described above, a scheme of determining a resource region is not limited to the above example and various schemes may be used.

In FIG. 11, STA 1 selects a random value 3 and the selected third slot is busy. Then, STA 1 selects and uses the first slot of an idle channel (i.e., the fourth resource region in the above example).

Meanwhile, in the example of FIG. 12, if a resource region selected by an STA belongs to a busy channel, the STA may randomly select a resource from among resource regions of an idle channel after the selected resource region and transmit a frame. When one resource region of a channel is present, the frame is transmitted in a corresponding region.

In the example of FIG. 12, STA 1 selects a random value 3 but the selected third slot is in a busy state. Then, STA 1 selects and uses a random resource region of an idle channel (i.e., the second channel) (the second resource region of the second channel in the above example).

Figure 13:
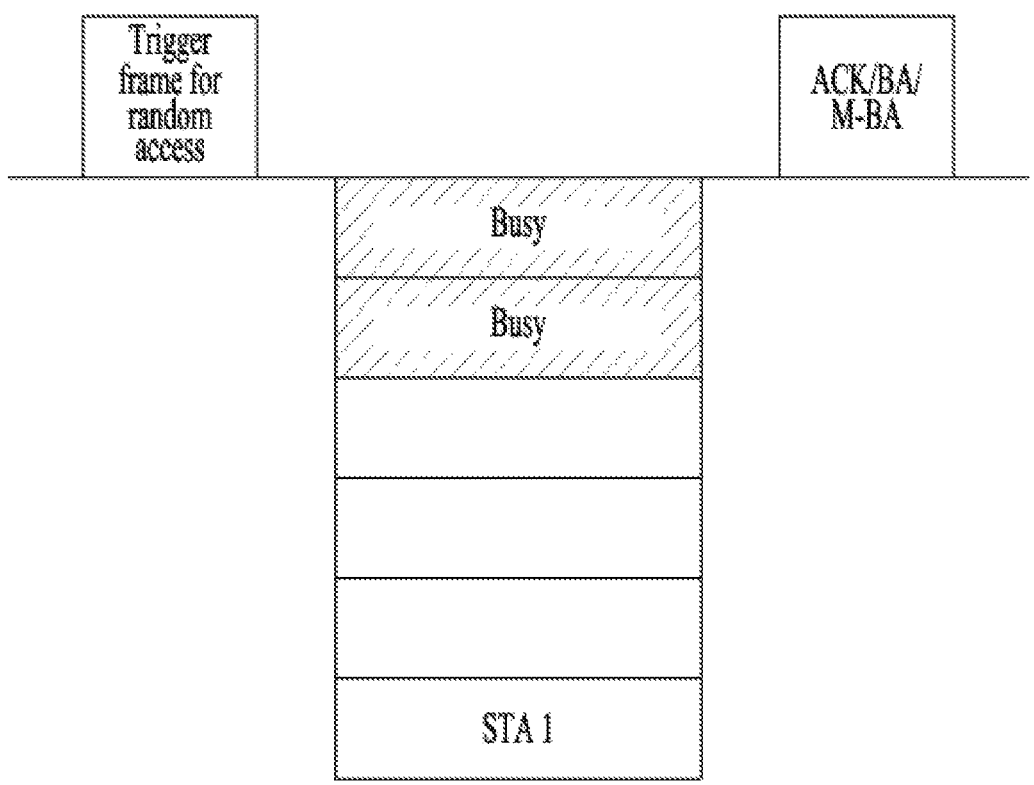
FIGS. 13 and 14 are diagrams illustrating a method of selecting a randomly selected resource from among idle resources according to an embodiment of the present invention.
Figure 14:
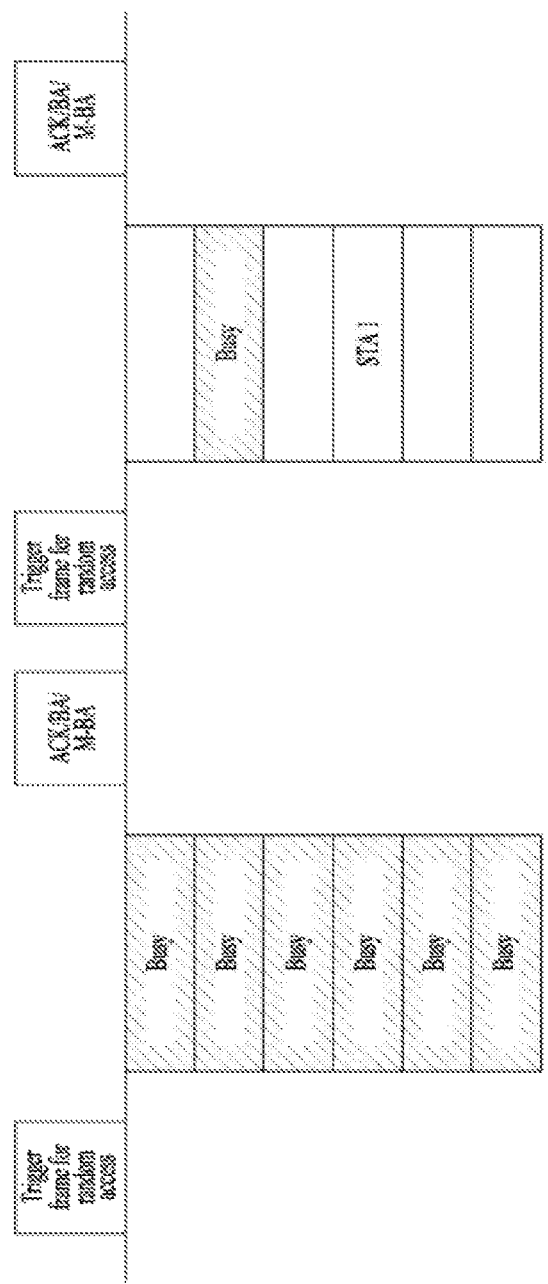

FIGS. 13 and 14 are diagrams illustrating a method of selecting a randomly selected resource from among idle resources according to an embodiment of the present invention.

In this embodiment, STAs check CCA before (or after) receiving a trigger frame for random access. The STAs randomly select a resource slot from among resource regions except for resource regions included in a busy channel among all resource regions allocated by the trigger frame and transmit a frame in the selected resource region.

In the example of FIG. 13, since the first resource region and the second resource region belong to a busy channel, STA 1 transmits a frame using a randomly selected resource region (i.e., the sixth resource region) among resource regions from the third to sixth resource regions.

If there is no idle channel, the STA re-attempts to perform transmission at a timing corresponding to the next trigger frame and this example is illustrated in FIG. 14. That is, while maintaining a random backoff count value 0 of the STA, the STA may select a resource region in which the STA is to perform transmission through random selection in the next trigger frame.

In the above example of FIG. 14, since all channels for all resource units allocated for random access by the first trigger frame are busy, the STA attempts to perform random access in random resource units allocated by the second trigger frame. If some resource units are busy or all resource units are idle in resource units allocated by the second trigger frame, the STA may randomly select one of resource units belonging to an idle channel and transmit a frame through the selected resource unit.

Similarly to the example of FIG. 10, since there is no idle channel after the STA receives the first trigger frame, the STA may select a random value in a region allocated by the second trigger frame and attempt to transmit a frame in order to attempt to perform random access after receiving the second trigger frame. In the above example, since STA 1 selects a random value 4 in the second trigger frame and a corresponding channel is idle, STA 1 may transmit a frame.

The above methods may be applied to the case in which some or all resource regions allocated by a trigger frame belong to a busy channel.

Introduction of Setting Random Access Threshold Value

According to another embodiment of the present invention, a scheme of determining whether an STA attempts to perform random access in a resource region allocated by a corresponding trigger frame based on a random access threshold value upon attempting to perform random selection during random access is proposed.

For example, if the random access threshold value is determined and a value selected for random selection exceeds the random access threshold value, the STA may not attempt to perform transmission at a corresponding timing and may delay transmission. If the value selected for random selection is within the random access threshold value, the STA attempts to perform transmission in a randomly selected resource region.

In this embodiment, a method of setting a window and a random access threshold value for selecting a random value for random access is proposed. The window for selecting the random value by the STA for random selection is determined by the total number of resource units for random access allocated by a trigger frame. For example, if the total number of resource units for random access allocated by the trigger frame is 9, the STA selects one random value from among 1 to 9 to select a random resource region.

The random access threshold value is determined by the total number of resource units belonging to an idle channel among resource units for random access allocated by the trigger frame. For example, if the total number of resource units allocated by the trigger frame is 9 and the number of resource units belonging to an idle channel is 6, the random selection window is set to 9 and the random access threshold is set to 6.

If a random value selected by the STA from the random selection widow of 9 is less than 6 (or is less than or equal to 6) under the above assumption, the STA may attempt to perform random access. However, if the selected value is equal to or greater than the random access threshold 6 (or is greater than 6), the STA may not attempt to perform random access.

Figure 15:
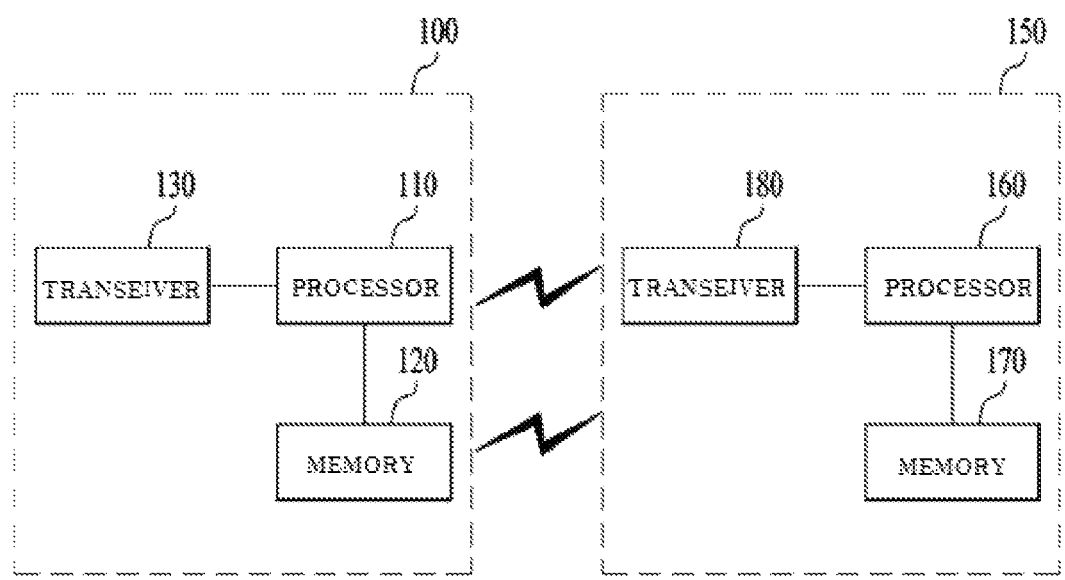
FIG. 15 is a diagram for explaining an apparatus for implementing the above methods.

Next, a method of transmitting a frame through random selection may use one of the above-described methods or use other methods. In the above-described embodiments, it is assumed that an NAV rule for a UL MU procedure defined in 11ax is applied as a NAV rule. For example, if an overlapping BSS (OBSS) NAV is set, the STA may not perform transmission even when CCA is idle and, otherwise, the above rule may be applied. FIG. 15 is a diagram for explaining an apparatus for implementing the above-described methods.

A wireless apparatus 100 of FIG. 15 may correspond to the above-described specific STA and a wireless apparatus 150 of FIG. 15 may correspond to the above-described AP.

The STA 100 may include a processor 110, a memory 120, and a transceiver 130 and the AP 150 may include a processor 160, a memory 170, and a transceiver 180. The transceivers 130 and 180 may transmit/receive a wireless signal and may be implemented in a physical layer of IEEE 802.11/3GPP etc. The processors 110 and 160 are implemented in a physical layer and/or a MAC layer and are respectively connected to the transceivers 130 and 180. The processors 110 and 160 may perform the above-mentioned UL MU scheduling procedure.

The processors 110 and 160 and/or the transceivers 130 and 180 may include an application-specific integrated circuit (ASIC), a chipset, a logical circuit, and/or a data processor. The memories 120 and 170 may include a read-only memory (ROM), a random access memory (RAM), a flash memory, a memory card, a storage medium, and/or a storage unit. If an embodiment is performed by software, the above-described methods may be executed in the form of a module (e.g., a process or a function) performing the above-described function. The module may be stored in the memories 120 and 170 and be executed by the processors 110 and 160. The memories 120 and 170 may be located at the interior or exterior of the processors 110 and 160 and may be connected to the processors 110 and 160 via known means.

The detailed description of the exemplary embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the above description has been given under the assumption that the invention is applied to an IEEE 802.11 based WLAN system, the present invention is not limited thereto. The present invention is identically applicable to various wireless systems capable of performing contention-based random access.

The invention claimed is:
1. A method of performing random access to an access point (AP) by a station (STA) operating in a wireless local area network (WLAN) system, the method comprising:
  receiving a first frame including resource allocation information for a random access from the AP;
  performing backoff using a backoff count based on a predetermined contention window size in resources allocated based on the resource allocation information for the random access;
  performing clear channel assessment (CCA) by the STA for the resources allocated based on the resource allocation information for the random access to adjust transmission of a second frame through a randomly selected resource based on a result of CCA, wherein the second frame is not transmitted at a first timing at which the backoff count reaches 0, when the randomly selected resource at the first timing is busy as the result of CCA;

receiving a third frame including second resource allocation information for a subsequent random access from the AP; and transmitting the second frame at a second timing through a second randomly selected resource from among resources allocated based on the second resource allocation information of the third frame, wherein when the third frame is received, the second timing is determined while the backoff count is maintained at 0.

2. The method according to claim 1, wherein the predetermined contention window size is determined in correspondence to a number of resource units of the resources allocated based on the resource allocation information for the random access.

3. The method according to claim 1, further comprising:

setting a random access threshold value corresponding to a number of resource units which are idle among the resources allocated based on the resource allocation information for the random access; and not attempting to perform random access in the resources allocated based on the resource allocation information for the random access of the first frame, when a randomly selected value within the predetermined contention window size is larger than the random access threshold value.

4. A station (STA) for operating in a wireless local area network (WLAN) system, the STA comprising:

a transceiver configured to receive a first frame including resource allocation information for a random access from an access point (AP) and transmit a second frame through a randomly selected resource from among resources allocated based on the resource allocation information for the random access; and a processor connected to the transceiver and configured to:

perform backoff using a backoff count based on a predetermined contention window size in the resources allocated based on the resource allocation information for the random access, perform clear channel assessment (CCA) for the resources allocated based on the resource allocation information for the random access to adjust transmission of a second frame through a randomly selected resource based on a result of CCA, wherein the second frame is not transmitted at a first timing at which the backoff count reaches 0, when the randomly selected resource at the first timing is busy as the result of CCA, receive a third frame including second resource allocation information for a subsequent random access from the AP, and transmit the second frame at a second timing through a second randomly selected resource from among resources allocated based on the second resource allocation information of the third frame, wherein when the third frame is received, the second timing is determined while the backoff count is maintained at 0.

* * * * *